March 26, 1935.  V. ROYLE  1,995,720
APPARATUS FOR APPLYING TALC, SOAPSTONE, OR THE
LIKE, TO INSULATED WIRE OR RUBBER TUBING
Original Filed Aug. 23, 1922   4 Sheets-Sheet 1

INVENTOR
Vernon Royle
BY
ATTORNEYS

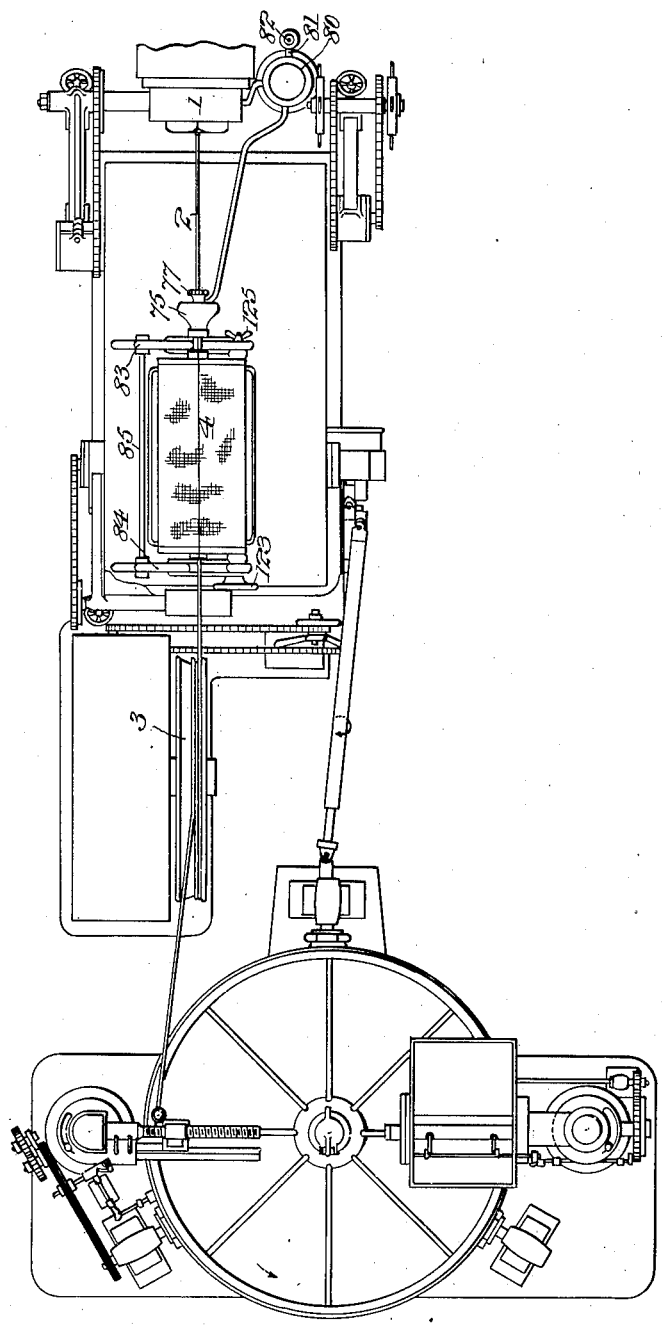

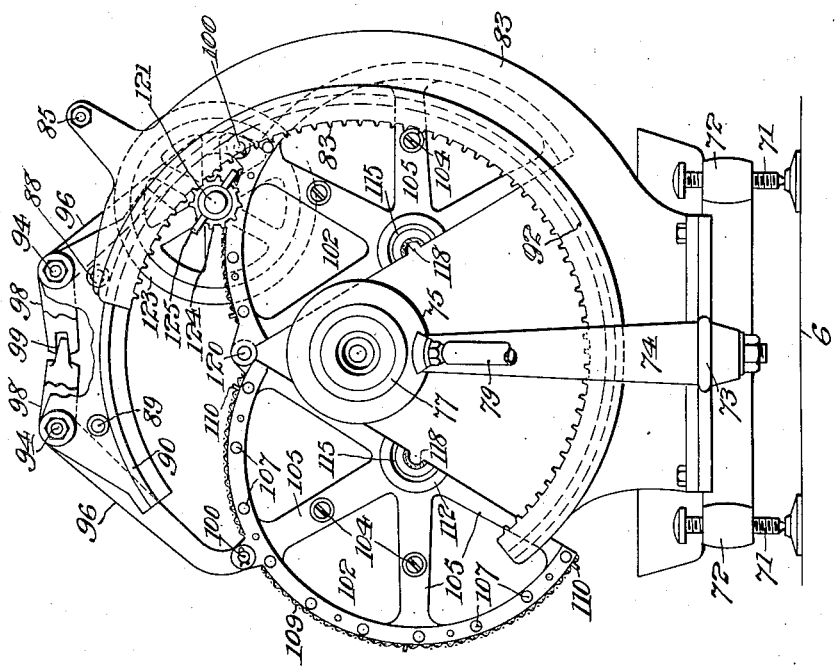
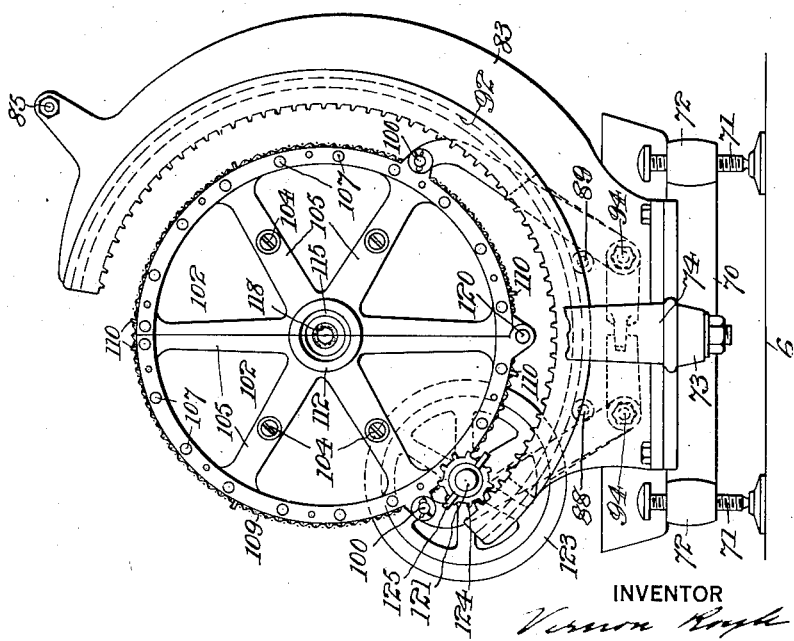

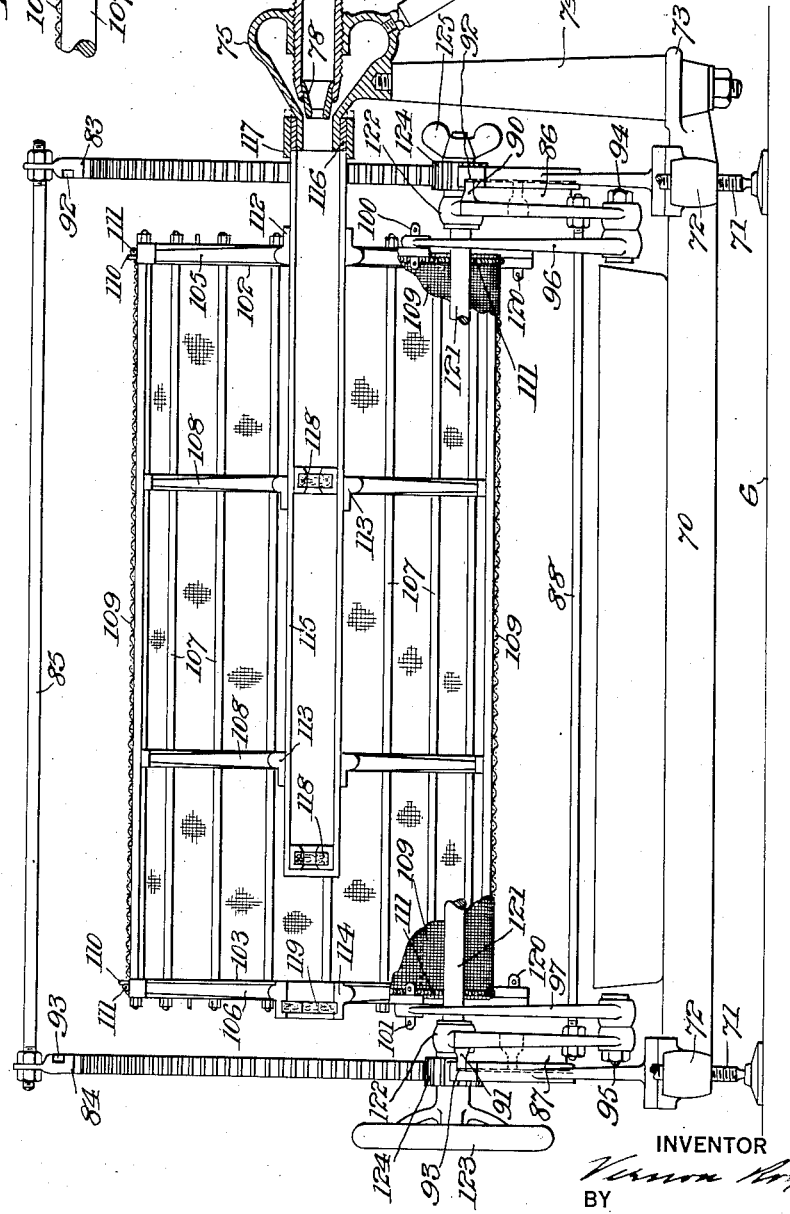

Patented Mar. 26, 1935

1,995,720

UNITED STATES PATENT OFFICE 1,995,720

APPARATUS FOR APPLYING TALC, SOAPSTONE, OR THE LIKE, TO INSULATED WIRE OR RUBBER TUBING

Vernon Royle, Paterson, N. J.

Original application December 17, 1929, Serial No. 414,715, which, in turn, is a division of my Serial No. 583,788, filed August 23, 1922, now Patent No. 1,745,644, dated February 4, 1930. Divided and this application March 15, 1933, Serial No. 660,799

12 Claims. (Cl. 91—59)

This invention relates to an apparatus for applying talc, soapstone, or the like, to insulated wire or rubber tubing from a tubing or insulating machine while it is passed through the apparatus.

An object of the invention is to provide an apparatus for subjecting the exterior of the material passing therethrough to air laden with talc, or the like.

Another object is to provide an apparatus having a conduit through which the material is passed, which conduit is arranged to receive a blast of air laden with talc, or the like, in order to coat the material therewith.

Another object is to provide an apparatus arranged to trap the fugitive talc and having means for separating the parts in order to empty the apparatus of the talc retained therein.

A further object consists in providing certain improvements in the form, construction and arrangement of the several parts whereby the above named and other objects may effectively be attained.

A practical embodiment of my invention is represented in the accompanying drawings, in which Fig. 1 represents a side elevation of a panning machine having my inproved apparatus incorporated therein;

Fig. 2 represents a plan view of the same;

Fig. 3 represents an end elevation of my talc or soapstone applying apparatus, on an enlarged scale, certain of the parts being removed;

Fig. 4 represents a similar view with the parts in another position;

Fig. 5 represents a side elevation of the same, partly in section, with the parts in the position as shown in Fig. 3; and Fig. 6 represents a detail, on a still larger scale, of the means of securing the gauze or muslin cover to the apparatus.

This application is a division of my co-pending application filed December 17, 1929, Serial No. 414,715, which, in turn, is a division of application filed August 23, 1922 and now U. S. Letters Patent No. 1,745,644 dated February 4. 1930.

Referring to Figs. 1 and 2 of the drawings, the head of the tubing or insulating machine is denoted by 1 and, as the said machine may be of any well known or approved form, it will not be further described herein. Insulated wire or tubing being extruded from the machine is denoted by 2.

In the general operation of the machine, the material is received from a tubing machine by a take-up drum 3, around which the material is coiled one or more times. On its way to the take-up drum, the material passes through a talc or soapstone applying apparatus, denoted generally by 4, which serves to coat the material with a layer of talc, soapstone, or the like. From the take-up drum 3 the material is fed to and coiled in a pan 5. After the desired amount of material has been placed in the pan, the material is severed and the pan may be placed in the vulcanizer for curing the material.

The several drive mechanisms of the panning machine are shown and described in my U. S. Letters Patent No. 1,745,644 and my co-pending application, Serial No. 414,715 above named and, as they form no subject matter of the invention claimed herein, they will not be described other than by reference to said patent and application.

It is to be understood that power is transmitted to the take-up drum 3, around which drum the material 2 is wound one or more times in order to be drawn under proper tension from the tubing machine, and the material fed to the pan 5.

While the material is passed from the tubing machine to the take-up drum 3, it is subjected to a coat of talc or soapstone in order to prevent adjacent coils from adhering to each other in passing around the take-up drum, and in the pan. This talc applying apparatus has already been referred to as generally indicated by 4 (Figs. 1 and 2). This apparatus is illustrated in Figs. 3 to 6 inclusive and comprises a base 70 which is adjustably mounted on top of the casing 6 by four screws 71, that are threaded in bosses 72 projecting from the corners of the base 70. This feature of adjustability enables the device to be drawn into perfect alinement with the tubing machine.

At the end of the base 70 adjacent the tubing machine, a lug 73 projects and acts as a support for a post 74 which carries a hollow head 75 that has a threaded aperture 76 adapted to receive a threaded guide 77. The inner end of the guide 77 is fitted with a removable tip 78, and it will be understood that similar tips having different sized openings may be fitted in the nozzle according to the diameter of the wire or other material being treated.

A hose 79 is threaded into the lower portion of the hollow head 75 and leads to a tank 80 which is adapted to be loaded with talc or the like, and is also connected, by means of a pipe 81, with a source of compressed air supply. A valve 82 in the pipe 81 serves to adjust the inflow of the compressed air, and it will be seen that, by opening the said valve, the compressed air will force the powdered talc up through the hose 79 into the hollow head 75. It will be observed that the head 75 surrounds the guide 77, so that a cloud of compressed air laden with talc is caused to surround the wire as it passes through the tip 78, and thereby provide it with a thorough coating of the talc dust or powder.

Two semicircular supports 83, 84 are bolted to the base 70 at each end thereof, and are steadied in their vertical position by a tie rod 85. Each of said supports is provided on its inner face with gear teeth, as clearly shown in Figs. 3, 4 and 5, for a purpose to be hereinafter described.

Two similar plates 86, 87 are located between and adjacent to the supports 83, 84. Said plates are connected by a pair of tie-bolts 88, 89 and each has formed on it a curved tongue or rib 90, 91 which are fitted to travel in corresponding grooves 92, 93, formed in the inner faces of the supports 83, 84. To each of these plates are pivoted, as at 94 and 95, two bent arms 96, 97. The short ends of each pair of said arms engage each other by a loose tongue and groove connection, as indicated at 98, 99, so as to compel them to work in unison; while the long ends of the said arms are pivoted, as at 100, 101, to a cylindrical framework which surrounds the wire as it is being coated with talc.

This cylindrical framework is divided on its central longitudinal line so as to constitute two half portions, each of which includes a pair of semicircular end pieces composed of plates 102, 103, consisting of fibre or the like, which are fastened, as by screws 104, to skeleton members 105, 106. The said end pieces are connected by a plurality of tie-rods 107 which are reinforced intermediate the end pieces by skeleton members 108. The framework, as a whole, is surrounded by a thin material, preferably fabric, 109, which is secured to the end pieces by pins 110 that project at intervals from the peripheries thereof, and by retractile coil springs 111, which are secured to the peripheries of the end pieces and lie in grooves formed therein, as clearly indicated in Fig. 6. This method of fastening permits the ready removal of the fabric 109 when desired.

The end pieces 102, 103, 105, 106, as well as the reinforcing members 108, are provided with central hubs 112, 113, 114, and a conduit 115 is fitted in the hubs 112, 113, and has one end in register with a band 116 which surrounds the inner end of the head 75; while a slidable collar 117 may be manually operated so as to surround the end of the conduit 115, for holding it in position with respect to the head 75 or for clearing the conduit so as to permit it to have lateral movement with respect to the head 75. The two positions of this collar are indicated in full and dotted lines in Fig. 5. It will be understood that the hubs 112, 113, 114, as well as the conduit 115, are each formed in two halves, as is the case with the cylindrical framework of which they constitute parts. The wire being treated passes through the guide 77 and tip 78, as already indicated, and it is thence led through the conduit 115 and hub 114, to the take-up drum 3. It is while thus passing through the conduit 115 that the coating of talc is applied and, in order to provide for a somewhat even distribution of the talc powder (which is in the form of a dust cloud under the influence of compressed air), a plurality of felt segments or half washers 118 are located in staggered order in the conduit 115. These serve to prevent the incoming talc powder from being at once forced to the end of the conduit furthest away from the tip 78, and thereby provide a more even and adequate subjection of the wire passing through the conduit, to the talc. A split felt washer 119 is inserted in the hub 114 at the point where the wire leaves the talc applying mechanism in order to prevent undue escape of powder at this point.

It will, of course, happen that a considerable amount of the talc powder will escape through the conduit 115 and into the large cylindrical framework which surrounds it. This fugitive powder will be trapped by the fabric walls of the said cylindrical framework and it will occasionally be necessary to empty the latter, owing to the accumulation. It is for this purpose that the cylindrical framework is made in two halves, as already described. These two halves are hinged to each other at each end, as shown at 120, and means is provided for inverting and opening the said two halves. This means comprises a shaft 121 which is mounted in bearings 122, carried by the plates 86, 87. On one end of the shaft 121 is a hand wheel 123, and on each end is a pinion 124, the one on the end away from the hand wheel being secured in place by a wing nut 125. This pinion 124 meshes with the teeth formed on the inner face of the support 83 so that, by turning the hand wheel 123, the pinion will be caused to travel along the inner face of the said support, whereby the plates 86, 87, which have the tongue and groove engagement with the supports 83, 84 will be caused to slide along the said supports. This movement of the plates will, of course, carry the arms 96, 97 and, by reason of the fact that the said arms are secured to the two halves of the cylindrical framework, the latter will be inverted after the pinion 124 has been moved nearly to the upper part of the support 83. At this position, a downward pressure, exerted manually upon the short ends of the arms 97, at the point 99, will cause the long ends of the said arms to separate and thereby open the two halves of the cylindrical framework as indicated in Fig. 4. This opening will, of course, empty out the accumulated talc powder, after which the cylindrical framework may be cleaned and the parts reversed so as to bring it back to operative position.

As the functions of the various parts of the apparatus have been described in connection with their description, it is not regarded as necessary to restate the operation at this point.

It will be understood that various changes may be resorted to in the form, construction and arrangement of the several parts without departing from the spirit and scope of my invention, and hence I do not intend to be limited to the details herein described, except as they may be set forth in the claims.

What I claim is:

1. An apparatus of the character described comprising, a tubular conduit through which the material is passed, means for applying talc, or the like, to the material as it passes through said conduit, a retainer surrounding the conduit for trapping the fugitive talc, said retainer being divided longitudinally into a plurality of parts, and means for inverting said retainer and separating the parts in order to empty the same.

2. An apparatus of the character described comprising, a straight tubular conduit through which the material is passed, means disposed at one end of the conduit for supplying a blast of air laden with talc, or the like, and directing it longitudinally through to said conduit in order to coat the material therewith, a plurality of elements spaced apart in staggered order in the conduit for restricting the passage of the incoming blast of air therethrough, a retainer surrounding the conduit for trapping the fugitive talc, said conduit, elements and retainer being composed of a plurality of parts divided longitudinally, and means for separating the parts in order to empty the same.

3. An apparatus of the character described comprising, a tubular conduit through which the material is passed, means for supplying a blast of air laden with talc, or the like, to said conduit in order to coat the material therewith, a plurality of elements disposed in staggered order in the conduit for restricting the passage of the incoming blast of air therethrough, and a retainer surrounding the conduit for trapping the fugitive talc, said retainer being divided longitudinally into a plurality of parts, and means for inverting said retainer and separating the parts in order to empty the same.

4. An apparatus of the character described comprising, a tubular conduit through which the material is passed, means for applying talc, or the like, to the material as it passes through said conduit, a cylindrical retainer surrounding the conduit for trapping the fugitive talc, said retainer and conduit being divided longitudinally into semicircular parts, said parts of the retainer being hinged together, and means for separating the parts in order to empty the same.

5. An apparatus of the character described comprising, a tubular conduit through which the material is passed, means for applying talc, or the like, to the material as it passes through said conduit, a cylindrical retainer surrounding the conduit for trapping the fugitive talc, supports for rotatably mounting the retainer therein, and mechanism for rotating the retainer in said supports.

6. An apparatus of the character described comprising, a tubular conduit through which the material is passed, means for applying talc, or the like, to the material as it passes through said conduit, a cylindrical retainer surrounding the conduit for trapping the fugitive talc, supports for rotatably mounting the retainer therein, mechanism for rotating the retainer in said supports, said retainer and conduit being divided longitudinally into semicircular parts, said parts of the retainer being hinged together, and means for separating the parts in order to empty the same.

7. An apparatus of the character described comprising, a horizontally disposed tubular conduit of substantially uniform diameter throughout its length through which the material is passed, and means surrounding the entrance end of said conduit for guiding the material and directing a blast of air laden with talc, or the like, longitudinally through said conduit in order to coat the material therewith as it is moved through the conduit.

8. An apparatus of the character described comprising, a horizontally disposed tubular conduit of substantially uniform diameter throughout its length through which the material is passed, means surrounding the entrance end of said conduit for guiding the material and directing a blast of air laden with talc, or the like, longitudinally through said conduit in order to coat the material therewith as it is moved through the conduit, and a retainer spaced from the conduit and surrounding the open end thereof for trapping the fugitive talc.

9. An apparatus of the character described comprising, a horizontally disposed tubular conduit of substantially uniform diameter throughout its length through which the material is passed, means surrounding the entrance end of said conduit for guiding the material and directing a blast of air laden with talc, or the like, longitudinally through said conduit in order to coat the material therewith as it is moved through the conduit, a retainer spaced from the conduit and surrounding the open end thereof for trapping the fugitive talc, said conduit and retainer being composed of a plurality of parts, and means for separating the parts longitudinally in order to empty the same.

10. An apparatus of the character described comprising, a horizontally disposed tubular conduit of substantially uniform diameter throughout its length through which the material is passed, means surrounding the entrance end of said conduit for guiding the material and directing a blast of air laden with talc, or the like, longitudinally through said conduit in order to coat the material therewith as it is moved through the conduit, and a plurality of segments spaced apart in the conduit for restricting the passage of the incoming blast of air therethrough.

11. An apparatus of the character described comprising, a horizontally disposed tubular conduit of substantially uniform diameter throughout its length through which the material is passed, means surrounding the entrance end of said conduit for guiding the material and directing a blast of air laden with talc, or the like, longitudinally through said conduit in order to coat the material therewith as it is moved through the conduit, and a plurality of segments spaced apart in staggered order in the conduit for restricting the passage of the incoming blast of air therethrough.

12. An apparatus of the character described comprising, a horizontally disposed tubular conduit of substantially uniform diameter throughout its length through which the material is passed, means surrounding the entrance end of said conduit for guiding the material and directing a blast of air laden with talc, or the like, longitudinally through said conduit in order to coat the material therewith as it is moved through the conduit, a plurality of segments spaced apart in staggered order in the conduit for restricting the passage of the incoming blast of air therethrough, and a retainer spaced from the conduit and surrounding the open end thereof for trapping the fugitive talc.

VERNON ROYLE.

CERTIFICATE OF CRRECTION.

Patent No. 1,995,720.  March 26, 1935.

VERNON ROYLE.

It is hereby certified that error appears in the printed specification of the above numbered patent requiring correction as follows: Page 2, second column, line 75, claim 2, strike out the word "to"; and that the said Letters Patent should be read with this correction therein that the same may conform to the record of the case in the Patent Office.

Signed and sealed this 23rd day of April, A. D. 1935.

Leslie Frazer (Seal)  Acting Commissioner of Patents.